Dec. 8, 1953      WILLEM VAN DOORN      2,662,199
ALTERNATING CURRENT RECTIFYING INSTALLATION

Filed Sept. 30, 1952      2 Sheets-Sheet 1

INVENTOR
WILLEM VAN DOORN
BY
AGENT

Dec. 8, 1953 WILLEM VAN DOORN 2,662,199
ALTERNATING CURRENT RECTIFYING INSTALLATION
Filed Sept. 30, 1952 2 Sheets-Sheet 2

INVENTOR
WILLEM VAN DOORN
BY
AGENT

Patented Dec. 8, 1953

2,662,199

UNITED STATES PATENT OFFICE 2,662,199

ALTERNATING CURRENT RECTIFYING INSTALLATION

Willem van Doorn, Eindhoven, Netherlands, assignor to Hartford National Bank and Trust Company, Hartford, Conn., as trustee Application September 30, 1952, Serial No. 312,386

Claims priority, application Netherlands October 2, 1951

7 Claims. (Cl. 315—144)

This invention relates to alternating current rectifying installations. More particularly, the invention deals with a rectifying installation wherein two or more gas-filled or vapor-filled discharge tubes are serially-connected in a multi-phase circuit, each discharge tube comprising an auxiliary electrode for maintaining an auxiliary arc, the auxiliary electrode of that discharge tube whose cathode has the highest positive direct-voltage potential being connected to a separate source of direct voltage for igniting the auxiliary arc. By a multi-phase circuit is meant a circuit involving two or more phases.

In conventional circuits of this kind, the auxiliary electrode of the other discharge tube is also connected to a separate source of direct voltage in order to be able also to maintain in this tube the auxiliary arc required for the discharge tubes.

The object of the present invention is to provide a simpler arrangement for such installations.

According to the invention, for this purpose the auxiliary electrode of the other discharge tube is connected to a rectified voltage positive with respect to the cathode of the other discharge tube and originating from the first-mentioned discharge tube in such manner that the auxiliary arc of the other discharge tube can be ignited. The rectified voltage of the rectifying installation itself is thus utilized for the ignition of the auxiliary arc of the other discharge tube, so that there is a saving of one separate ignition device.

In order that the invention may be more clearly understood and readily carried into effect, it will now be described in greater detail with reference to the examples shown in the accompanying drawing, wherein.

Figure 1:
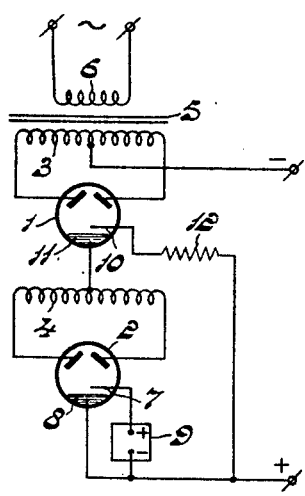
Fig. 1 is a schematic diagram of a first preferred embodiment of the invention.

In Fig. 1, two discharge tubes 1 and 2, which are supplied in two-phase relation from transformer windings 3 and 4, are connected in series. The two windings 3 and 4 may be provided on the same core 5 of the supply transformer, of which the primary winding connected to an alternating-current source is designated 6. An auxiliary electrode 7 of tube 2, of which a cathode 8 has the highest positive direct-voltage potential, is connected to a separate direct-voltage source 9 for igniting the auxiliary arc between the auxiliary electrode 7 and the cathode 8, which consists, for example, of mercury. The auxiliary electrode 10 of the other tube 1 is connected to the positive direct voltage of tube 2, which voltage is thus also positive with respect to a cathode 11 of the other tube 1, so that the auxiliary arc between 10 and 11 is also ignited and the rectifying installation may become fully operative. The tubes 1 and 2 may furthermore comprise separate control electrodes. An auxiliary anode resistance 12 may be provided for limiting the current traversing the auxiliary arc.

Figure 2:
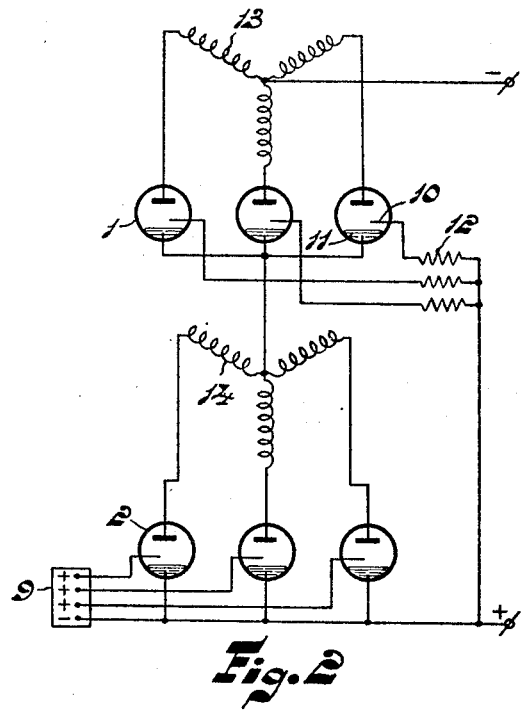
Fig. 2 is a schematic diagram of a second embodiment.

Fig. 2 shows a similar circuit, except that here a series-combination of two three-phase rectifiers is shown. The primary winding of the transformer for supplying two three-phase secondary windings 13 and 14 is omitted for the sake of clearness. The three positive direct voltages for the auxiliary arcs of the lower discharge tubes are tapped from the direct-voltage source 9. Here also the direct-voltage for the auxiliary arcs of the upper tubes is derived from the positive voltage supplied by the lower tubes.

Figure 3:
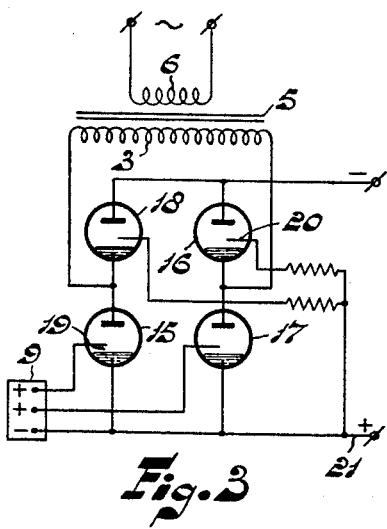
Fig. 3 is a schematic diagram of a third embodiment.

Fig. 3 shows a two-phase Grätz circuit. The series-connected tubes 15 and 16 on the one hand and those designated 17 and 18 on the other hand are connected to the secondary winding 3. If the left-hand side of this winding has a positive potential, the tubes 15 and 16 will have to become current-conveying. An auxiliary arc 19 of tube 15 is ignited by the direct-voltage source 9, so that tube 15 may become current-conveying under the action of the positive anode voltage. As soon as this takes place, the auxiliary electrode 20 of tube 16 becomes positive, since it is connected to a positive terminal 21 of tube 15, and the auxiliary arc in tube 16 can ignite, so that this tube also becomes current-conveying. The tubes 17 and 18 will similarly become operative during the subsequent half-wave of the alternating-current cycle. In the circuits hitherto known, a particular auxiliary anode voltage is required for each of the tubes 16 and 18 due to the different potentials thereof.

Figure 4:
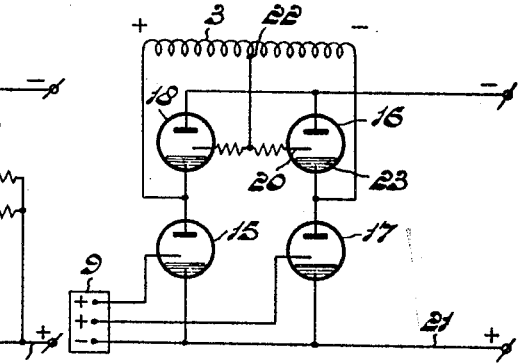
Fig. 4 is a schematic diagram of a fourth embodiment.

Fig. 4 also shows a two-phase Grätz circuit, in which, in contradistinction with the circuit shown in Fig. 3, the positive voltage for the auxiliary electrodes of the tubes 16 and 18, instead of being taken from the positive terminal 21, is taken from a center tap 22 (neutral point) of the secondary winding 3. Said center tap, if, for example, tube 15 is current-conveying, has a direct-voltage potential which is positive with respect to the cathode 23 of tube 16 (which potential has superposed on it half of the alternating voltage of the secondary winding 3 and this in the positive sense, since the right-hand end of winding 3 is negative if tube 15 is current-conveying, so that the center-tap has a positive alternating-voltage potential with respect to the cathode 23). Consequently, after the ignition of tube 15, tube 16 will also ignite.

Figure 5:
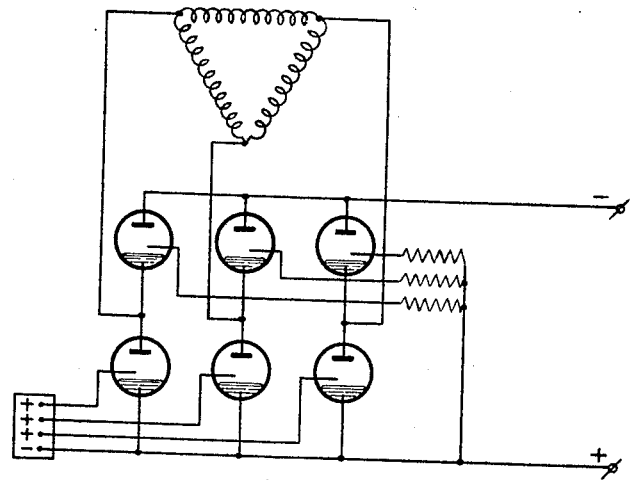
Fig. 5 is a schematic diagram of a fifth embodiment.
Figure 6:
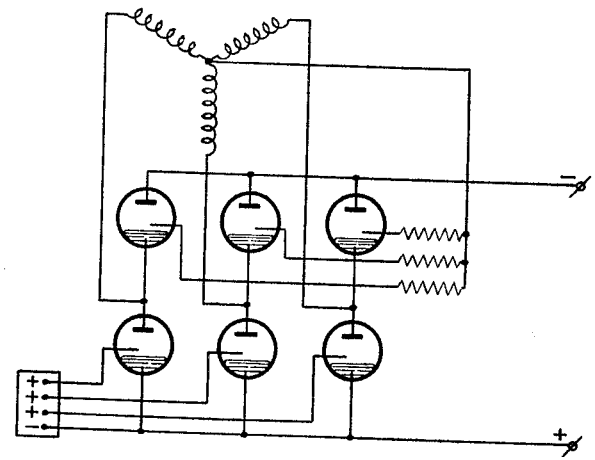
Fig. 6 is a schematic diagram of a sixth embodiment.

Fig. 5 shows a three-phase Grätz circuit which otherwise operates in a similar manner as the circuit shown in Fig. 3; and Fig. 6 shows a three-phase Grätz circuit which otherwise operates in a manner similar to Fig. 4. The operation of the circuits shown in Figs. 5 and 6 will be clear without further explanation.

While we have thus described our invention with specific examples and embodiments thereof, other modifications will be readily apparent to those skilled in the art without departing from the spirit and the scope of the invention as defined in the appended claims.

What I claim is:

1. A rectifying installation comprising a multi-phase rectifying circuit provided with first and second electron discharge tubes in serial connection, each having a cathode, an anode and an auxiliary electrode for maintaining an auxiliary arc therein, said multi-phase circuit producing a higher positive potential at the cathode of said second tube than at the cathode of said first tube, means to apply a positive potential to the auxiliary electrode relative to cathode of said second tube to ignite same, and means to convert the auxiliary electrode of said first tube to a potential which is positive to the cathode thereof and originating from said second tube to ignite said first tube.

2. A rectifying installation comprising a multi-phase rectifying circuit provided with first and second electron discharge tubes in serial connection, each tube having a cathode, an anode and an auxiliary electrode for maintaining an auxiliary arc therein, said multiphase circuit producing a higher positive potential at the cathode of said second tube than at the cathode of said first tube, a direct-current source connected to the auxiliary electrode of said second tube to ignite same, and means to apply the positive potential at the cathode of the second tube to the auxiliary electrode of the first tube to ignite same.

3. A rectifying installation, as set forth in claim 1, wherein said rectifying circuit includes a transformer having a centertapped secondary winding and wherein said tubes are included in a Grätz circuit, the auxiliary electrode of said first tube being connected to said centertap.

4. A rectifying installation comprising a transformer having a primary and a pair of center-tapped secondary windings, a pair of electron discharge tubes, each provided with a cathode, a pair of anodes and an auxiliary electrode for maintaining an auxiliary arc therein, the anodes of one tube being connected to the ends of one secondary winding and the anodes of the other tube being connected to the ends of the other secondary winding, the cathode of said one tube being connected to the center tap of said other secondary winding, a direct voltage source connected between the auxiliary electrode and cathode of said other tube to ignite same, means to derive a direct output potential between the cathode of said other tube and the centertap of said one winding, and means to apply the potential of the cathode of said other tube to the auxiliary electrode of said one tube to ignite the latter.

5. An installation, as set forth in claim 4, further including a current limiting resistor interposed between the cathode of said other tube and the auxiliary electrode of said one tube.

6. A rectifying installation comprising a three-phase circuit including a pair of three-phase transformers each provided with three windings having a neutral terminal, a set of three electron discharge tubes in conjunction with each transformer, each tube including a cathode, an auxiliary electrode and an anode, the anode of each set being connected to a respective winding, the cathodes of the first set being connected to the neutral point of the second transformer, means including a direct voltage source to apply a positive potential relative to cathode to the auxiliary electrode of each tube in the second set to ignite same, means to derive a direct output voltage between the neutral point of the first transformer and the cathodes of the second set, and means to couple the cathode of said second set to the auxiliary electrodes of the tubes in the first set to ignite same.

7. A rectifying installation comprising a transformer having a primary and a centertapped secondary winding, first and second electron discharge tubes in serial connection, each tube having a cathode, an anode and an auxiliary electrode for maintaining an auxiliary arc therein, said second tubes being connected with their anodes to the ends of the secondary winding and with their auxiliary electrodes to an ignition source connected to their cathodes, the anodes of said first tubes being connected to each other and their auxiliary electrodes being connected to the center tap of said secondary winding so as to convert said auxiliary electrodes to a positive potential to ignite said first tubes.

WILLEM v. DOORN.

No references cited.